W. J. UEBLER.
MILKING MACHINE.
APPLICATION FILED JAN. 22, 1909.
1,111,978.
Patented Sept. 29, 1914.
3 SHEETS—SHEET 3.
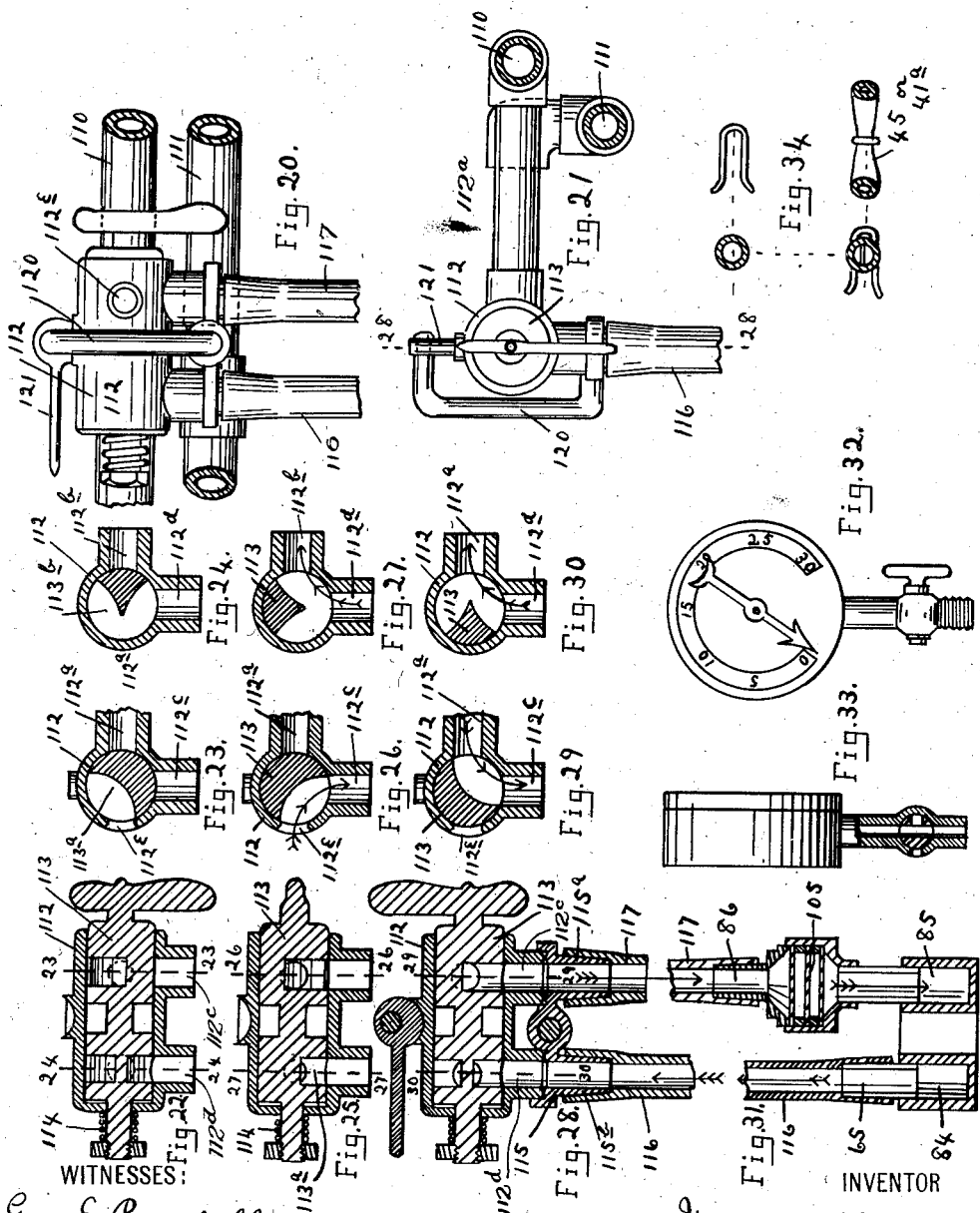

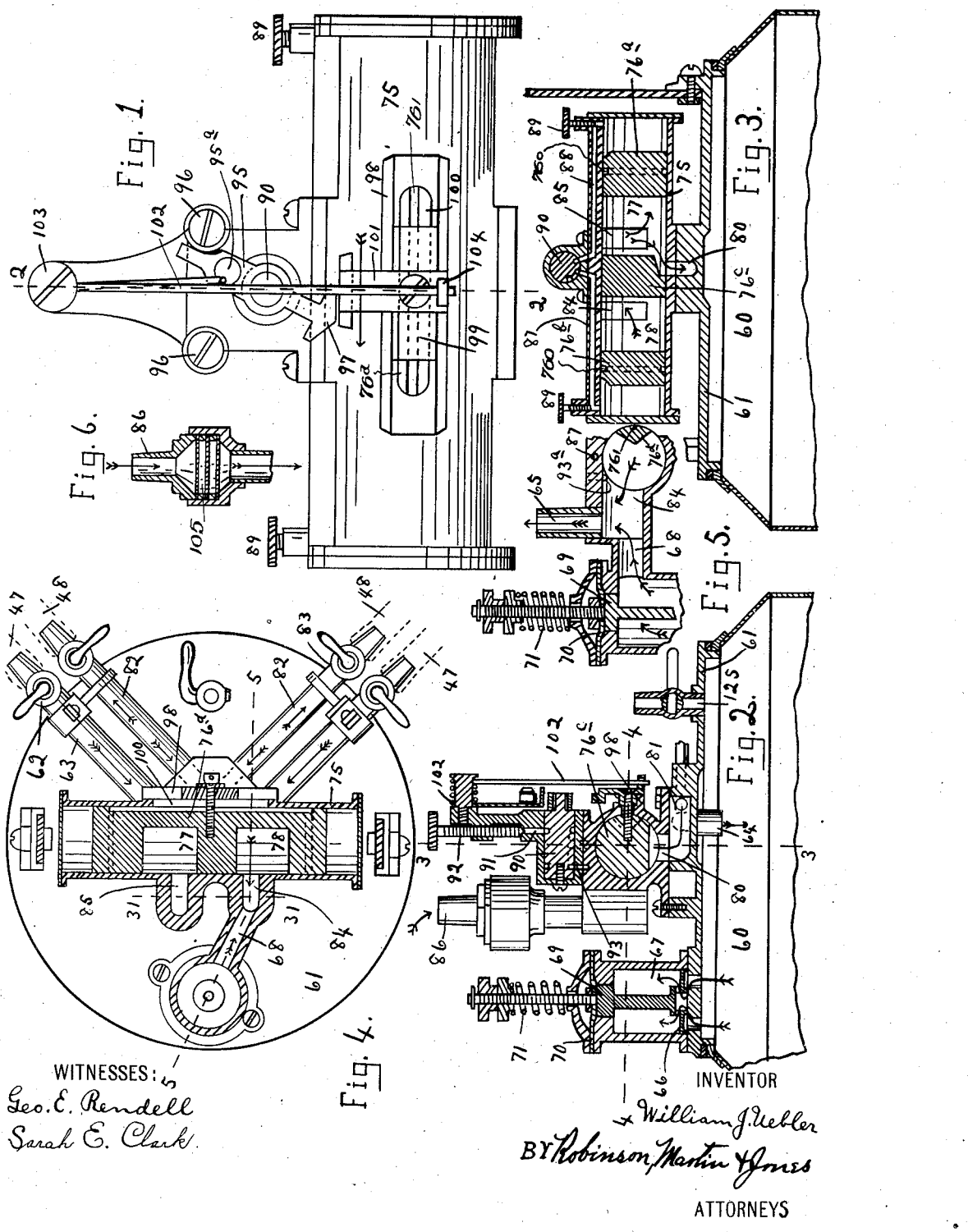

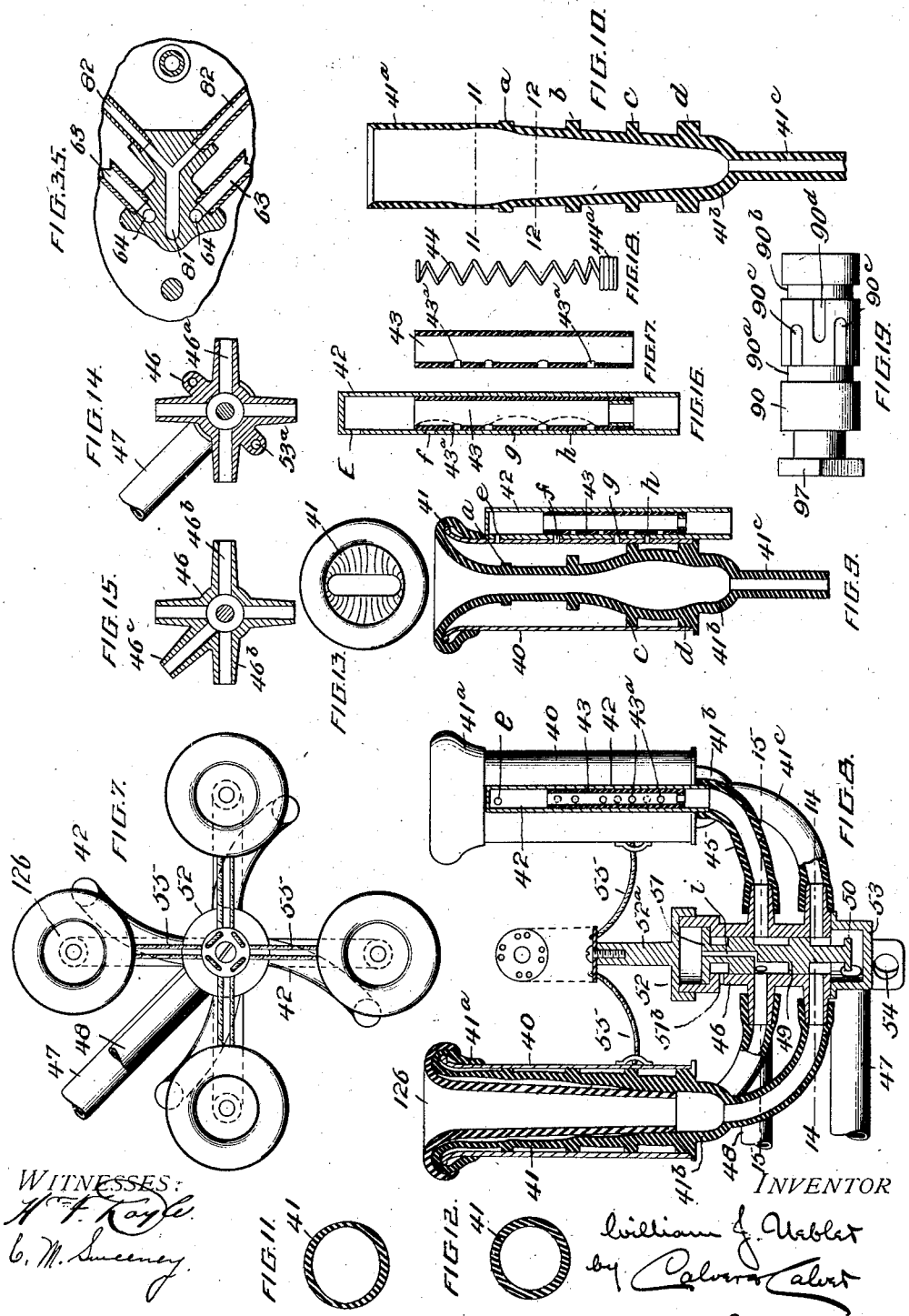

UNITED STATES PATENT OFFICE.

WILLIAM J. UEBLER, OF WEST SCHUYLER, NEW YORK.

MILKING-MACHINE.

1,111,978.  Specification of Letters Patent.  Patented Sept. 29, 1914.

Application filed January 22, 1909. Serial No. 473,697.

*To all whom it may concern:*

Be it known that I, WILLIAM J. UEBLER, of West Schuyler, in the county of Herkimer and State of New York, have invented certain new and useful Improvements in Milking-Machines; and I do hereby declare that the following is a full, clear, and exact description thereof, which will enable others skilled in the art to which it appertains to make and use the same, reference being had to the accompanying drawings, and to the letters of reference marked thereon, which form part of this specification.

The object of my present invention is to provide a milking machine, which is simple in construction and efficient, readily taken apart for cleaning or otherwise, and readily assembled and well adapted to meet the requirements of a practical machine.

Figure 1 shows a side elevation of a portion of the machine known as the pulsator. Fig. 2 is a vertical cross-sectional view of the pulsator on a somewhat reduced scale taken on line 2, 2 of Fig. 1, together with some additional parts of the machine. Fig. 3 is a longitudinal sectional view of the pulsator taken on line 3, 3 of Fig. 2. Fig. 4 is a horizontal sectional view of the pulsator taken on line 4, 4 of Fig. 2. Fig. 5 is a partial sectional view taken on line 5, 5 of Fig. 4. Fig. 6 is a sectional detail of a filter employed in the machine. Fig. 7 shows a plan view of the set of teat cups employed in the machine together with some of their appurtenances. Fig. 8 shows some of the teat cups with their appurtenances mostly in vertical section. Fig. 9 shows in vertical section a single teat cup with the flexible cup lining partially collapsed. Fig. 10 is a vertical sectional view of the teat cup lining independent of the other parts. Figs. 11 and 12 are cross-sectional views of the flexible teat cup lining taken on line 11, 11 and 12, 12, respectively, of Fig. 10. Fig. 13 is a top view of the teat cup with the lining collapsed as shown in Fig. 9. Fig. 14 is a partial section on line 14, 14 of Fig. 8 through portions of the milk ducts. Fig. 15 is a partial section on line 15 of Fig. 8 through a portion of the air ducts. Figs. 16, 17 and 18 show details of construction of a valve mechanism employed in connection with the teat cup. Fig. 19 is a full sized detail of an automatic controlling valve employed in the pulsator. Fig. 20 shows a front elevation of a detachable connection employed between the main line suction and presser pipes and the branches to the milking machine including a valve or gate controlling branches. Fig. 21 is a side elevation of said connection shown together with cross-sections of said main line pipes. Fig. 22 is a longitudinal vertical section view on the central line of one member of said detachable connection including the valve or gate controlling the branch passages. Figs. 23 and 24 are cross-sectional views of the same showing the movable valve or gate parts in position corresponding with that of Fig. 22. Fig. 25 is another longitudinal sectional view corresponding with Fig. 22 with the valve or gate parts in a shifted position. Figs. 26 and 27 are cross-sectional views corresponding with the position shown in Fig. 25. Fig. 28 is a vertical sectional view of the assembled parts of the detachable pipe connection taken on line 28, 28 of Fig. 21 with the movable part, however, of the gate in a shifted position. Figs. 29 and 30 are cross-sectional views of one member of the detachable connection with the gate shown in the same position as shown in Fig. 28. Fig. 31 is a sectional detailed view taken on a line corresponding with 31, 31 of Fig. 4. Figs. 32 and 33 are front and side elevations of a vacuum gage which may be employed in connection with the machine. Fig. 34 shows several details of a clamp for closing the rubber milk tubes, serving the same purpose as a valve or gate. Fig. 35 is a detail view, in horizontal section, of a part of the top of the milk receptacle, showing the milk and air passages therein.

The teat cups, which are provided in a set of four, consist of a cylindrical shell or casing 40 of rigid material as metal, into which is introduced the collapsible flexible lining 41 preferably of rubber and normally of substantial circular form on cross-section. This lining is provided at its upper end with a relatively thin tubular extension 41$^a$ adapted to be folded over the upper end of the casing 40 and toward its lower end the lining preferably contracts in a somewhat tapering form and is closed at its lower end by an end portion 41$^b$, except for a flexible tubular extension 41$^c$ preferably formed integral with the cup lining and providing a passage for milk out of the teat cup. On the exterior, the walls of the lining particularly on the conical portion are provided with integral ribs as $a$, $b$, $c$ and $d$, the latter forming practically a plug or closure for the lower end of the casing or shell 40, while the other ribs, that is to say, $a$, $b$ and $c$ subdivide the space between the casing and lining into a set of normally independent chambers. The normal diameter of the lining at the peripheries of the ribs $a$, $b$ and $c$ will preferably be somewhat greater than the internal diameter of the casing 40 so that normally the ribs $a$, $b$, $c$ and $d$ will fit snugly in the casing. Along one side of the casing 40 there is provided a preferably tubular member forming an exterior chamber 42 from which there are openings, as $e$, $f$, $g$ and $h$ into the several chambers between the teat cup lining and the casing. For closing the passages $f$, $g$ and $h$ against fluids moving inwardly toward the teat cup chambers there is provided a valve consisting as herein shown of a thin very pliable rubber tube 43. This tube may be formed simply by wrapping a thin flexible sheet of rubber into tubular form without uniting the edges, and the same fits the lower portion of the chamber 42 occupying the space opposite the ports $f$, $g$ and $h$.

Along one wall the tubular valve piece 43 will preferably be provided with a series of openings as indicated at $43^a$, which do not, however, register with the ports $f$, $g$ and $h$, but may occupy positions quite close thereto to allow fluids to pass through from the exterior to the interior of the tubular valve 43. For holding the tube 43 against collapsing under suction, there may be introduced therein an open spiral spring-like distender 44 of somewhat reduced diameter with reference to the diameter of the part 43, except at its lower extremity $44^a$, which may be a close coil of larger diameter serving as a fastening device for the part 43 in the chamber 42. Connected to the lower end of the chamber 42 is a flexible tube 45 by means of which fluid, preferably air, can be introduced under pressure into the teat cup chambers, or a suction may be applied to the same. Adjacent to the upper end excluding the turned-over part $41^a$ the teat cup lining is preferably made thick on two of its opposite walls and thin on the other two substantially opposite walls, as shown in cross-section in Fig. 11, whereby it is adapted to be collapsed in a somewhat oval form, as shown in the top view in Fig. 13. The several milk tubes $41^c$ and air tubes 45 from the teat cups of a set are deflected inwardly and connected with a common fitting 46 containing milk and air passages and a controlling valve. As to the milk passages the fitting 46 is provided with several tapering nozzles $46^a$ on to which the lower inturned ends of the milk tubes $41^c$ are slipped, so as to make a tight fit and an outlet nozzle onto which the common milk conductor tube 47 is slipped, is provided on a detachable portion of the fitting 46. The fitting 46 is also provided with a set of nozzles $46^b$ onto which the lower inturned ends of the air tubes 45 are slipped and closely fit, and the outlet nozzle $46^a$ on which the end of the flexible air tube 48 is fitted. The fitting 46 contains a vertical tubular chamber which receives the body of the vertically movable plunger 49 carrying at the lower end the valve 50 and at the upper end a piston head 51 fitting in a somewhat enlarged chamber in the top of the fitting 46. The top of the fitting 46 is closed by a cap 52, while the lower part is closed by a detachable portion 53, suitably secured to the main portion of the fitting 46, as by bolts passing through openings $53^a$ (see Fig. 14) in said fitting, which portion 53 in addition to the nozzle for connection with the common milk tube 47 may also contain an eye 54 by which the set of teat cups may be readily suspended in an inverted position on a hook.

The plunger 49 is provided with two reduced sections, the upper one of which always registers with the plane of the passages through the nozzles $46^b$, and the lower one always registers with the passages through the nozzles $46^a$, while the valve 50 is adapted substantially to fit an opening in the lower end of the main portion of the fitting 46 just below the plane of the passages through the nozzles $46^a$. A small passage $i$ is provided through the upper portion of the plunger 49 affording a communication between the chamber containing the piston head 51 and the encircling chamber of the plunger opposite the air passages of the nozzles $46^b$. The cap 52 will preferably be provided with a post $52^a$ carrying a plate at its upper end having a set of holes, which receive cords 55 connecting the top of the post with the shells of the teat cups and afford a flexible but a limiting connecting between the top of the post $52^a$ and the teat cups. The cord 55 may be a continuous cord running through eyes in the post plate and loops on to the cup shells, as shown in Fig. 7 whereby some of the connections may be taken up, while others may be slackened and almost any relative adjustment desired be readily secured. From the set of teat cups the common milk tube 47, which is preferably flexible rubber, is carried to the receiving vessel 60. This vessel is preferably provided in the top with a large opening adapted to be closed by a cover 61 on which the pulsator and other mechanism of the machine is mounted. The cover 61 is provided with a fitting 62 (see Fig. 4) including preferably a stop cock to which the receiving tank end of the tube 47 is attached, and after being continued in a short section of glass tube 63 (see Figs. 4 and 35) through which the flow of the milk can be readily observed, discharges at a suitable point through the cover 61 directly into the receiving tank through a nozzle 64 (see Fig. 2). The air in the receiving tank 60 is more or less exhausted or rarefied in order to provide a suction through the milk tube 47 to the interior of the lining of the teat cups, and this more or less rarefied or exhausted condition either in the receptacle or elsewhere will for brevity be referred to as a vacuum. The receptacle is exhausted through the medium of a branch suction tube 116 applied at the nozzle 65. The vacuum pressure that is maintained in the receptacle 61 may be determined and regulated by the valve 66 located in the valve chamber 67 and operating over several outlet openings through the top of the cover 61. The upper portion of the valve chamber 67 is placed in communication with the nozzle 65 by a passage 68, and at the upper end is also provided with a cylindrical opening in which plays the piston head 69 provided on the stem of valve 66. In connection with the piston 69 there is also preferably provided a flexible diaphragm 70, the peripheral edges of which are secured between the top of the valve chamber and the cap thereof. The stem of the valve 66 is continued above the valve chamber where it receives a spring 71 adjustably confined between screw-threaded nuts on the upper end of the valve stem and the cap of the valve chamber. The valve 66 will preferably be constructed in the form shown in Fig. 2, having its under face recessed with a circular groove registering with the openings in the cover 61 whereby only two ring bearing faces are secured and air passages are provided through the central portion of the valve.

The pulsator cylinder 75 is mounted on the cover 61 in a horizontal position and contains practically three piston heads 76ª, 76ᵇ and 76ᶜ, closely fitting in the cylinder and connected for simultaneous movement by an integral bar part 76ᵈ, whereby in one view of the matter the three heads become practically one piston having chambers 77 and 78. In the bottom the cylinder 75 is provided with a single port 80 (Figs. 2 and 3), which is in communication with a small chamber 81 (see Figs. 2 and 35) in the body of the cover 61, which latter chamber is in communication with pipes 82 (see Fig. 4) extending to the fittings 83 which fitting includes a stop cock and is adapted to receive one end of the flexible air pipe 48 extending to the teat cups. In one side the cylinder 75 also has an exhausting port 84 and an inlet port 85, the former in communication with the nozzle 65 before referred to, and the latter in communication with a nozzle 86 through which air under pressure may be supplied. As the piston in the cylinder 75 is reciprocated to and fro the ports 84 and 85 are alternately thrown into communication with the port 80. In order to provide against leakage past the piston heads 76ª and 76ᵇ, they are preferably provided with circumferential grooves 760 as shown in Fig. 3, which grooves lead into a longitudinal groove 761 in the back of the connecting bar 76ᵈ and thus to the atmosphere through a slot 100 in the side of the cylinder hereinafter referred to. In the upper wall of the cylinder 75 extending from ports in the top of the cylinder adjacent to the middle to each end of the cylinder are provided air passages 87 and 88. At their ends where they open into the cylinder these passages may be provided with regulating screws 89, 89.

Mounted in a suitable valve seat or socket on the top of the cylinder 75 is a rocking valve 90 having two encircling grooves 90ª and 90ᵇ (see Fig. 19) with two longitudinal grooves 90ᶜ, 90ᶜ opening into the groove 90ª and an intermediate longitudinal groove 90ᵈ extending in the opposite direction and opening into the groove 90ᵇ, these several grooves serving as air passages, as hereinafter more fully pointed out. As the valve 90 rocks the inner overlapping ends of the grooves 90ᶜ and 90ᵈ are adapted to register with the ports at the adjacent ends of the passages 87 and 88. The circumferential groove 90ª is adapted to register with an inlet port 91 open to the atmosphere and controlled at its entrance by an adjustable needle valve 92. The encircling groove 90ᵇ of the valve 90 registers with the port at 93 in the bottom of the valve casing, which port is continued in a passage 93ª opening into the suction chamber or port 84 before referred to. For operating the rock valve 90 it is provided on one of the external projecting ends with an arm 95, which at its upper end plays between two rubber faced bumpers 96, 96, and at its lower end is provided with a triangular shoe 97. A slide way 98 on the side of the cylinder 75 supports a reciprocating slide 99 secured to the piston in the cylinder preferably with a screw, so that the slide reciprocates in conjunction with the piston. The screw passes through a slot 100 in the side of the cylinder. This slide 90 carries a standard 101 having a plate at its upper end of a limited length adapted to engage with either of the two faces of the triangular shoe 97 before referred to. The two-arm spring 102 is provided mounted on a fixed support 103. The shorter arm of this spring has an inturned end, which engages in an opening 95ª in the arm 95 of the rock valve, while the longer arm engages in an eye 104 on the slide 99. The normal position of the spring 102 is with the two arms both in the same plane. In connection with the tube having the nozzle 86 a strainer or filter 105 (see Figs. 6 and 31) may be employed as a precaution against foreign substances getting into the mechanism through the medium of the air used in operating the device.

For supplying air under pressure and the suction required for operating milking machines of the character herein described, the stable where the machines are to be used will preferably be provided with two main line pipes 110 and 111 (see Fig. 20) with pumping mechanisms connected therewith for producing the air pressure and suction respectively. At suitable points provision is made for placing these pipes in communication with branches leading to the mechanism hereinbefore described. To this end I provide a valve or gate casing 112, which receives a rotary valve or gate 113 in a chamber preferably having a slight taper and into which the valve is drawn by a spring 114, which takes up the wear and tends to keep the valve always tight. The pipes 110 and 111 respectively communicate with the casing 112 through pipes or passages 112$^a$ and 112$^b$, (see Figs. 21 and 23 to 30). The casing 112 has branch passages 112$^c$ and 112$^d$ corresponding with the passages 112$^a$ and 112$^b$ respectively. These passages are provided in short projecting nipples adapted to receive the removable portion of the detachable connection hereinafter referred to. A portion of the gate or valve 113, which controls the passages 112$^a$ and 112$^c$, is provided with a cut-out or recess as indicated at 113$^a$, while the portion of the valve or gate which controls the passages 112$^b$ and 112$^d$ is cut out as indicated at 113$^b$. The removable member of the detachable connection is indicated by 115 (see Fig. 28) and includes two shallow sockets adapted to receive the ends of the nipples before referred to with an interposed packing and two taper nozzles 115$^a$ and 115$^b$ adapted to receive the ends of the branch flexible pressure pipe 117 and exhaust or vacuum pipe 116 respectively, these pipes being carried to and connected with the nozzles 86 and 65, respectively, before referred to. A link 120 is provided having one pintle end engaging in the member 115, while the other pintle end carries a cam lever 121. The cam lever is adapted to engage in a seat on top of the casing 112 and when the parts 115 and 112 are assembled draw the member 115 toward the casing 112 and secure a tight joint or connection between the two for the branch connecting tubes. In the plane of the passages 112$^a$ and 112$^c$ the casing 112 is provided with a port or opening 112$^e$ open to the atmosphere. The cover 61 is further provided with a passage 125 controlled by a stop cock therein, which when opened will serve to relieve the suction or partial vacuum within the receptacle and allow the cover 61 to be removed, and to this passage 125 may be attached by a suitable pipe coupling a vacuum gage, as shown in Figs. 32 and 33, useful more particularly in testing or experimenting with the machine.

For small teats a reducing bushing 126 may be employed in the teat cup, this bushing consisting of a somewhat funnel-shaped flexible rubber piece adapted to engage the teat substantially throughout its length and to fill the space between the teat and the lining 41, said bushing having a flaring and out-turned upper end adapted to fit over and around the regular parts of the teat cup.

Having described the details of the construction by means of the reference characters, some of the features of construction and mode of operation may perhaps be referred to to advantage. When the gate 113 at the main line pressure and suction pipes is turned to the position shown in Figs. 22, 23 and 24 the branches therefrom are shut off. When the detachable member 115 is applied and secured by operating the cam lever 121, the gate 113 may then be operated preferably first to the position shown in Figs. 25, 26 and 27. This opens the passage from the main line of suction pipe to the branch suction pipe 116, and the same operating through the nozzle 65 and the passage 68, the valve chamber 67 and the ports controlled by the valve 66 will shortly exhaust the receptacle 60 to the degree required for successfully operating the machine. The degree to which the receptacle is exhausted will largely be controlled by the relative area of the diaphragm 70 and that of the valve 66. Further than this, the degree may be regulated by adjusting the tension of the spring 71. At the time that the gate or valve 113 is in position shown in Figs. 25, to 27 inclusive, the branch pipe 117 is thrown open to the atmosphere, as appears clearly in Fig. 26. In case the machine is to be operated entirely by suction as it may be, although not preferably so, atmospheric air for the operation of the teat cups will enter through this port 112$^e$ and the gate or valve 113 will not require to be used in any other positions than the two now referred to, namely: the closed position shown in Figs. 22 to 24 inclusive, and one of the open positions shown in Figs. 25 to 27 inclusive. In case of using the machine with compressed air, however, after the receptacle becomes exhausted the gate or valve 13 is operated to the position shown in Figs. 28 to 30 inclusive. In this latter position the suction is still continued through the branch pipe 116 and the branch pipe 117 is put in communication with the main line pressure pipe. When air under pressure is supplied through the pipe 117, or even when atmospheric air is supplied through this pipe (a sufficient vacuum or suction being utilized in the pipe 116) and the piston in the pulsator cylinder is shifted more or less to the left-hand position, as shown in Fig. 3, the air has access through the port 85, the piston chamber 77, the port 80, the pipe 82, the flexible tube 48 and the passages of the fitting 46 to the branch tubes 45, the teat cup casing chamber 42 and the chambers in the teat cup between the lining and the shoulder. The air under pressure through the port e enters the uppermost chamber of the teat cup and as the same becomes inflated the upper portion of the teat cup lining is more or less collapsed on the teat. When the inflation of the upper chamber has proceeded to some extent, the compression of the lining draws away the encircling rib a and the inflation continuing through the port e then inflates the two upper chambers until it becomes sufficient to collapse that portion of the lining carrying the rib b, which opens up the space into the third chamber and the inflation may continue progressively, as described, until all of the chambers between the lining of the teat cup and the casing become inflated. And if air under sufficient pressure is continued to be supplied the lowermost ring d of the teat cup will become sufficiently distorted to allow the compressed air to escape around the periphery of this ring and between it and the shell or casing to the atmosphere. At the same time that the teat cup is being inflated, as described, suction is applied to the teat within the lining through the medium of the tube $41^c$, the passages of the teat cup fitting 46 and the tube 47 from the receptacle, the stop cock in the fitting 62, of course, being open. After the teat cup has been duly inflated the operation then is to deflate it, and this is accomplished by placing the tubes 45 with the passages leading to the port 80 in communication with the exhaust port 84 in the pulsator cylinder by shifting the pulsator piston more or less to the right-hand position, from that shown in Fig. 3. When suction is applied to the casing chamber 42 air is withdrawn from the chambers between the teat cup lining and the casing through the several ports e, f, g and h. As to the latter three the tubular lining 43 serving as a valve collapses sufficiently to open these ports. The arrangement shown not only allows the several teat cup chambers to be exhausted quickly, but at the final stage of the operation allows each teat cup chamber to be exhausted separately. At the time that suction is applied to exhaust the chambers of the teat cup, suction is also applied through the passage i to the chamber above the piston 51 in the fitting 46. Exhausting this chamber serves to draw the plunger 49 upwardly, one effect of which is to operate the valve 50 to close the passage from the teat cup milk pipes $41^c$ into the common milk pipe 47. A cushioning effect on the upward movement of the plunger 49 is secured by so locating the inlet opening $51^b$ with reference to the encircling groove under the piston head 51 that this inlet passage will be shut off by the piston before it reaches the upper limit of its movement. When the suction through the pipe 48 is relieved at the fitting 46 and replaced by air under pressure, the air under pressure operating reversely from that just described serves to force the plunger 49 downwardly and open the valve 50.

The pulsator is operated by suction which, from the chamber of which the nozzle 65 is the outlet, communicates through the passage $93^a$ with the port 93 registering with the encircling groove $90^b$ of the rock valve 90. When rocked to one position the branch groove $90^d$ of the valve 90 registers with the inner end of one of the passages 87 or 88 along the top of the pulsator cylinder, whereby the suction is applied to one end or the other of the cylinder, and when so applied moves the piston in the direction of the end to which the suction is applied. At the time that the branch groove $90^d$ of the rock valve 90 registers with one of these ports, one of the other of the branches $90^c$ or $90^e$ from the groove $90^a$ registers with the other. This allows air to freely enter the opposite end of the cylinder from that to which suction is being applied from the passage 91. The flow of air into the passage 91 is regulated by adjusting the needle valve 92. It may be here noted that considerable importance is attached to the fact that the valve 92 is directly at the beginning of this inlet passage. This arrangement makes the most restrictive point directly at the entrance, whereby foreign matter is more effectually excluded than if the most restrictive point was elsewhere. Substantially at the completion of the movement of the pulsator piston in each direction the position of the rock valve 90 is automatically changed by the spring 102. This spring is placed under tension first in one direction and then in the other direction by being connected with the piston, as heretofore described. The operation of the valve 90 is retarded or timed by engagement of one face or the other of the shoe 97 with the top of the stand 101 until the full movement of the piston in one direction or the other is nearly reached, when these two parts become disengaged and the spring 102 is free to operate to shift the position of the rock valve instantly. The rapidity of the motion of the pulsator piston may be generally regulated by adjusting the needle valve 92 and as to its movement in either direction, further regulated by adjusting the screws 89. In other words, by regulating the independently adjustable valve screws 89 the passage of air to and from either end of the pulsator cylinder may be varied, thereby varying the rapidity of movement of the pulsator piston in one direction with respect to its movement in the opposite direction. By this means the time during which suction is applied to the teat chambers of the teat cups may, at will, be made relatively longer or shorter with respect to the time during which said suction is relieved. In its movement from right to left, as shown in Fig. 3, the piston head 76ᶜ first uncovers the port 85, allowing the compressed air to freely enter the chamber 77 in the piston. The continued movement in this direction opens the port 80 allowing the compressed air to have access through the port 80 and the connecting passages to the chambers of the teat cup and inflate the same. The further continued movement from right to left of the piston head 76 shuts off the port 84 in connection with the suction apparatus. The movement of the piston head 76ᶜ from left to right, as shown in Fig. 3, first opens the port 84, allowing suction to be applied to the chamber 78 in the piston, and next shuts off the port 80 cutting off the pressure therefrom. That portion of the face of the head 76ᶜ, which closes the port 80, is somewhat wider in the direction of the length of the piston than is the width of the port, so that there is some interval of time allowed in which the port 80 is completely cut off. This interval is useful in allowing the compressed air stored in the passages and inflated chambers of the teat cup to expand and continuing the pressure on the teat as the milk is being withdrawn. On its farther passage toward the right, as shown in Fig. 3, the piston 76ᶜ opens up the port 80 to the chamber 78 allowing the suction apparatus to operate on the inflatable chambers of the teat cup and deflate the same.

In case one or more of the teat cups of a set are not required, those not in use may be temporarily cut off by closing the pipes 45 and 41ᶜ by means of a clip such as shown in Fig. 34, forced over these pipes and collapsing the same.

It will be noted that all parts of this apparatus are constructed to be readily disconnected and taken apart, whereby all parts requiring careful cleaning are readily accessible. Also that the teat cups are readily assembled and disassembled without requiring tools or special appliances, and altogether of a character that will make them practical for use by unskilled persons.

Modifications and changes in and from the construction herein described may be made without departing from the invention as hereinafter intended to be claimed.

What I claim as new and desire to secure by Letters Patent is:

1. A teat cup having a rigid shell and a collapsible lining having encircling spaced ribs adapted to engage with the shell to provide a series of inflatable chambers, substantially as set forth.

2. A teat cup having a tubular rigid shell, an inflatable lining within the shell having spaced external ribs detachably engaging with the shell and providing a series to some extent of independent inflatable chambers between the shell and lining, substantially as set forth.

3. The combination in a teat cup of a tubular shell of rigid material, a flexible lining within the shell having a set of external ribs fitting the shell and means for inflating and deflating the spaces between the lining and shell, substantially as set forth.

4. The combination in a teat cup of a tubular rigid shell, an elastic lining having encircling elastic ribs normally fitting against the walls of the shell and dividing the space between the lining and the shell normally into a series of chambers, and means for inflating the chambers successively and deflating them simultaneously, substantially as set forth.

5. The combination in a teat cup of a rigid tubular casing open at each end, an elastic lining having external elastic ribs normally fitting the casing and subdividing the space between the casing and lining normally into a series of inflatable chambers, the teat cup lining substantially fitting and closing the lower end of the casing and means for inflating and deflating the spaces between the casing and lining, substantially as set forth.

6. The combination in a teat cup of a tubular casing open at each end, an elastic tubular lining having an extension at the upper end adapted to be folded over the upper end of the casing and being closed into a conductor at the lower end and having encircling elastic ribs normally closely fitting the casing and dividing the space between the lining and casing into a series of inflatable chambers, and means for inflating and deflating said chambers between the lining and the casing, substantially as set forth.

7. The combination of a teat cup having a series of inflatable chambers, means providing an exterior chamber having a series of ports opening into said teat cup chambers, and a valve controlling said ports consisting of a flexible tube inserted into said exterior chamber opposite said ports, substantially as set forth.

8. A teat cup having a series of inflatable chambers, means providing an exterior chamber having a series of ports opening into said teat cup chambers, a valve for controlling said ports consisting of a thin flexible tube introduced into said exterior chamber, and means for limiting the collapse of said tube, substantially as set forth.

9. The combination with a teat cup having inflatable chambers and a collapsible flexible lining, of a reducer consisting of a tube of flexible material adapted to be inserted within the lining and substantially to fill the space between the teat and lining, said tube having a flaring end to fit the upper end of the teat cup, substantially as set forth.

10. In a milking machine having passages for a motive fluid, the combination with a set of teat cups having chambers adapted to be inflated by fluid from said passages, and milk tubes leading from said teat cups, of a common fitting having a valve controlling the flow of milk in said tubes, a piston chamber in communication with said motive fluid passages, and an operating piston for said valve in said chamber, substantially as set forth.

11. In a milking machine pulsator the combination of a cylinder having motive fluid ports, a reciprocating piston in the cylinder, a valve controlling said ports, a valve operating spring connected with the valve and piston, and interengaging devices carried by the piston and valve respectively for preventing movement of the valve prior to a predetermined time, substantially as set forth.

12. A set of teat cups and a common fitting to which the cups are connected at the lower ends by flexible tubes in combination with a standard on the fitting, and adjustable flexible connections between the several teat cups and the standard, substantially as set forth.

13. In a milking machine pulsator, the combination of a cylinder having motive fluid ports, a reciprocating piston in the cylinder, a valve controlling said ports, a valve operating spring directly connected with the valve and piston, and means connecting said valve and piston for preventing movement of the valve prior to a predetermined time, substantially as set forth.

14. In a pulsator for milking machines the combination of a cylinder having inlet and outlet ports through its sides and motive fluid passages leading into each end, a reciprocating chambered piston in the cylinder controlling the ports and shifting the chambers of the piston with reference to the ports, a rock valve controlling the motive fluid passages, a two-arm spring connected at one end to the rock valve and at the other to the piston whereby the spring is placed under tension alternately in opposite directions, and means for releasing the valve substantially at the end of the stroke of the piston and at other times holding it, substantially as set forth.

15. In a milking machine pulsator, the combination of a slotted cylinder having motive fluid ports, a reciprocating piston in the cylinder, a rock valve controlling said ports and having an operating arm, a valve operating spring operatively connected with said piston, and a slide secured to said piston through the slot in said cylinder and coöperating with said valve operating arm for preventing movement of the valve prior to a predetermined time, substantially as set forth.

16. In a pulsator for milking machines the combination of a cylinder having inlet and outlet ports through its sides and motive fluid passages leading into each end, a piston in the cylinder controlling the ports, a rock valve controlling the motive fluid passages, a spring connected at one end to the rock valve and at the other to the piston through a slot in the side of the cylinder, a slide of limited length connected with the piston and operating in connection with an arm of the rock valve to time its operation, substantially as set forth.

17. A detachable branch coupling for main line pipes for milking machine connections consisting of a valve casing having branch passages connecting with the main lines and outlet passages terminating in nipples, a valve in the casing controlling the branch passages, a detachable member having sockets to receive said nipples and hose connections and a clamp for binding the detachable member to the valve casing, substantially as set forth.

18. In a milking machine pulsator, the combination of a slotted cylinder having motive fluid ports, a reciprocating piston in the cylinder, a rock valve controlling said ports and having an operating arm, a valve operating spring, and a slide secured to said piston through the slot in said cylinder and coöperating with said valve operating arm for preventing movement of the valve prior to a predetermined time, said valve operating spring being connected at its opposite ends to said valve operating arm and slide respectively, substantially as set forth.

19. In a milking machine pulsator, the combination of a cylinder having motive fluid ports, a reciprocating piston in the cylinder, a slide connected with said piston, a rock valve controlling said ports and having an operating arm provided with a triangular head engaging said slide to control the operation of said valve, and a spring operatively connected with said piston for operating said valve, substantially as set forth.

In witness whereof, I have affixed my signature, in presence of two witnesses, this 8th day of January, 1909.

WILLIAM J. UEBLER.

Witnesses:
 SARAH E. CLARK,
 EMMA S. HESSE.